Feb. 6, 1968
A. R. INGRAM
3,367,891
PERMEABLE FOAMED STYRENE POLYMER
Filed Dec. 15, 1965
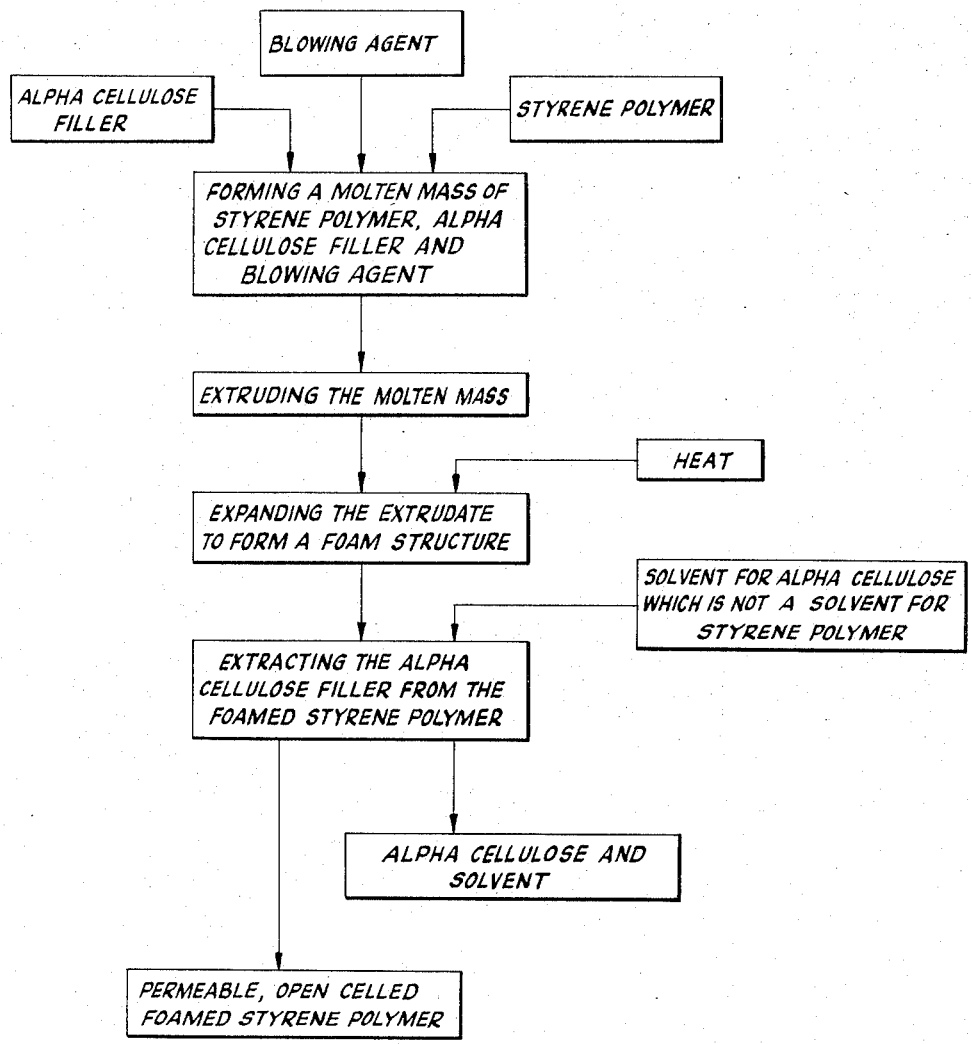
INVENTOR.
ALVIN R. INGRAM
BY John P. Taylor
his Agent United States Patent Office 3,367,891
Patented Feb. 6, 1968

3,367,891
PERMEABLE FOAMED STYRENE POLYMER
Alvin R. Ingram, Murrysville, Pa., assignor to Koppers Company, Inc., a corporation of Delaware
Filed Dec. 15, 1965, Ser. No. 514,024
10 Claims. (Cl. 260—2.5)

ABSTRACT OF THE DISCLOSURE

An alpha cellulose filler is added to an expandable styrene polymer. After expansion of the styrene polymer, the alpha cellulose is removed from the foam structure. This can be accomplished by extracting the alpha cellulose with a solvent which is not a solvent for the styrene polymer. The removal of the alpha cellulose renders the foam structure permeable by the formation of tiny openings between adjacent cells corresponding to the location of the alpha cellulose in the cell walls.

---

This invention relates to a method of preparing permeable foamed polymeric materials. More particularly it is concerned with the method of preparing permeable foamed styrene polymer utilizing a filler material which is later removed from the foamed styrene polymer.

The art of making integral low density cellular polymeric structures having uniform small voids from expandable styrene polymers is well established. The expanded styrene polymers so produced are closed-cell foams. That is to say, there is relatively little communication between cells.

Users of such foam styrene polymers have long wished for a method of making such foams permeable. Permeable styrene polymer foams could be used as acoustical materials, as battery separators, and as insulators in applications where a certain amount of "breathing" is desirable, such as in clothing or inner soles of shoes.

I have discovered that permeable foamed polystyrene can be produced by the addition of an alpha-cellulose filler to an expandable styrene polymer. The alpha-cellulose is then removed from the expanded styrene polymer after the foam structure is formed by leaching with a solvent which is not a solvent for the styrene polymer. The removal of the alpha-cellulose renders the foam structure permeable by the formation of tiny openings between adjacent cells corresponding to the location of the alpha-cellulose in the cell wall.

In accordance with the invention, a molten mass of expandable styrene polymer having a blowing agent and an alpha-cellulose filler therein is expanded to form a foam structure. The alpha-cellulose filler is then extracted from the foamed styrene polymer with a solvent which is not a solvent for the polystyrene.

The alpha-cellulose filler is a fibrous extract from delignified wood. Cellulose is generally defined as a polymer of β-D-glucose units. Alpha-cellulose is that portion of the cellulose pulp that is insoluble in 17.5 percent sodium hydroxide solution.

The amount of alpha-cellulose filler may vary from about five percent to thirty percent by weight of the unexpanded polymer. I prefer using about ten percent by weight of unexpanded polymer. The limits are a practical matter readily determined by one in the art between a minimum which when later leached out will leave a completely permeable interconnecting system and a maximum which when later leached out will leave sufficient styrene polymer in the foam structure to insure adequate physical strength for the intended application. Expandable styrene polymers are commercially available from various suppliers. Styrene polymers that can be made expandable include polystyrene, alkyl-substituted styrenes, copolymers of styrene and alpha-methylstyrene, copolymers of styrene and alkyl-substituted styrenes, e.g., vinyl toluene, copolymers of styrene and small amounts of divinylbenzene and copolymers of butadiene or other dienes or acrylonitrile and styrene. The expandable polymers have incorporated therein from 3 to 30 parts by weight of an aliphatic or cycloaliphatic hydrocarbon boiling below the melting point of the polymer. Typical hydrocarbons include petroleum ether, pentane, hexane, heptane, cyclopentane, cyclohexane, cyclopentadiene, and mixtures thereof. The expandable polymer may also have incorporated therein carbon dioxide liberating agents such as organic acids and alkali and alkaline earth carbonates and bicarbonates such as described in Patent No. 2,941,964.

Advantageously, the molten mass of alpha-cellulose filler and the expandable styrene polymer is produced in an extruder. An effective extruder and process of mixing and extrusion is described and claimed in the co-pending application of Vesilind, Ser. No. 288,309. The resultant mixture is flowed through the extruding die as a stream into a cooling media. The cooled stream may then be chopped into particles of convenient lengths for example as disclosed in Patent No. 3,089,857.

Various means such as hot water, infrared rays, steam, and radio frequency waves have been suggested for heating the particles to cause them to expand into an integral cellular polymeric structure. Polystyrene and the related expandable polymeric materials, however, approach in varying degrees the ideal dielectric (they are virtually transparent to the power applied to them by high frequency waves, they cannot be heated to their melting point in a high frequency field) so it has been necessary to treat the particles of expandable polystyrene to render them receptive to radio frequency waves, and one method of doing so is described in Patent No. 2,998,501.

Surprisingly, the alpha-cellulose filler imparts a higher loss factor to the expandable particle enabling it to absorb sufficient energy from the high frequency waves to heat by molecular friction. The thermal energy thereby produced is transferred to the expandable polymeric materials to cause the formation of an integral low density cellular product having uniform small voids.

After the styrene polymer has been expanded it is treated with a solvent to remove the alpha-cellulose filler material. Any solvent which will dissolve the alpha-cellulose and not attack the styrene polymer is satisfactory. Such solvents generally are inorganic acids and inorganic bases. Examples of such solvents are: concentrated sulfuric acid (sp. gr. 1.84), concentrated hydrochloric acid (12 N), 85 percent phosphoric acid, and cupra ammonium hydroxide $(Cu(NH_3)_4(OH)_2)$. The resulting permeable foam may then be washed with water.

The general process for carrying out the invention is illustrated as by flow diagram in the drawing.

It should be noted here that although the chemical structure of cellulose and starch are quite similar, varying only in the β orientation of the glycosidic linkage between glucose units in the cellulose, the use of alpha-cellulose with styrene polymers is in marked contrast with the use of starch which appears to chemically interact with the styrene and therefore cannot be completely removed thereafter.

It should also be noted here that the swelling effect of the cellulose may be used to obtain pores of larger size. If desired, for larger porosity, a cellulose swelling agent such as dibenzyldimethyl ammonium hydroxide or similar tetra-alkyl ammonium bases may be added to the composition.

The following examples, wherein unless otherwise designated, will serve to illustrate the invention:

Example I

Polystyrene beads (50 parts) and alpha-cellulose (5 parts) were added to a drum blender and the blender was operated for five minutes, stopped, and the resulting mixture removed from the blender. This mixture was added to the hopper of a 1½ inch National Rubber Machinery extruder with a length to diameter ratio of 20:1 and was extruded through an orifice die as thirteen $\frac{1}{16}$ inch strands directly into a water bath which was maintained at a temperature of 40–50° F. The barrel of the extruder was fitted with a metering pump which was adjusted to supply sufficient n-pentane so that the extrudate contained seven percent by weight of pentane. From the water bath the strands were led to a chopper where they were cut into $\frac{1}{16}$ inch length solid particles of unfoamed, filled, expandable polystyrene.

A red oak mold having a cavity approximately five inches square and 1½ inches deep was placed on a sheet of plywood ¼ inch thick and was partially filled, about 25 percent full, with the alpha-cellulose filled expandable polystyrene particles. Plywood was placed on a mold, and the mold placed on an aluminum tray between the electrodes of the high frequency unit (Model 34A-LH "Thermal Electronic Heat Generator" was obtained from W. T. LaRose and Associates, Inc. of Troy, N.Y.). The aluminum tray rested on strips of insulating material that held it at approximately ¼ inch above the ground electrode. A one-inch thick piece of high density polystyrene (to serve as an air gap) was then placed on top of the mold assembly to provide a holding pressure on the mold assembly during formation of the polystyrene foam and the hot electrode was lowered until it exerted pressure on the high density polystyrene slab. The filled expandable polystyrene was exposed to the high frequency field for five seconds. The foam, thus formed, was allowed to cool under the pressure exerted by the electrode for approximately three minutes. The mold assembly was removed from the unit, and foamed polystyrene was extracted from the mold. The resulting product was a slab of uniform foam of low density having an even, compact surface.

Example II

The alpha-cellulose was extracted from the foamed polystyrene slab of Example I. The slab was treated with five gallons of concentrated sulfuric acid (sp. gr. 1.84) for 24 hours. The slab was then washed with water until pH paper indicated the wash water to be free of acid. The standard anthrone test for cellulose made on a section of the slab was negative. Microscopic examination of the slab showed it to have retained its cellular form. When wetted with a highly colored aqueous dye solution, the dye could be seen entering the cells through hollow tubes or pores left by the dissolved cellulose.

Example III

A slab of alpha-cellulose filled foamed polystyrene was made in accordance with the procedure of Example I. The slab was wetted with methanol and the alpha-cellulose extracted therefrom with approximately seven gallons of cuprammonium solution, a cellulose solvent. The slab was washed with water, dilute hydrochloric acid, and more water. The cuprammonium solution was prepared from 22.4 parts anhydrous cupric hydroxide dissolved in 92 parts of concentrated ammonia solution diluted with eight parts of water.

The product was a permeable-open cell slab similar to that produced in Example II.

Example IV

To a drum tumbler was added 50 parts polystyrene beads (Dylite) containing 6.45 percent by weight of normal pentane and 2.5 parts of alpha-cellulose. After heating, the mixture was extruded as in Example I and the strands chopped into $\frac{1}{16}$ inch lengths. Examples of the resulting particles were placed in a 12 inch by 12 inch by ½ inch vented mold to fill the mold approximately eight percent full. The mold was closed and steam introduced therein. After ten minutes the addition of steam was discontinued, the mold cooled and then opened and the product, a cellular polystyrene having uniform density, was removed.

The molded product was then treated with concentrated hydrochloric acid (12 N) to dissolve the alpha-cellulose. After 12 hours the molded polystyrene was removed from the acid solution and washed in water to remove excess acid. The polystyrene was found to be in a permeable, open cell form. It would readily absorb liquid dyes which were used to test the permeability of the polystyrene.

Example V

Polystyrene beads having incorporated therein 6.1 percent by weight pentane were admixed on a ribbon blender with 10 parts by weight alpha-cellulose, 0.77 percent by weight citric acid hydrate and 0.91 percent by weight sodium bicarbonate. The mixture was extruded at a temperature of 315° F. as a ½ inch thick foamed slab or board having a density of 4.3 pounds per cubic foot. The foamed slab was treated with sulfuric acid as in Example II. After 24 hours, the slab was washed with water to remove the acid, dried, and examined under a microscope. The resulting product was confirmed to be a permeable open-cell structure.

The method as disclosed herein describes a novel process for obtaining a permeable foamed polymeric material. Furthermore, the alpha-cellulose filler enables one to use high-frequency heating techniques to expand polymeric materials which are otherwise transparent to such energy.

I claim:

1. The method of making a permeable foamed styrene polymer which comprises:
   (a) forming a foamed structure from a mixture of expandable styrene polymer and alpha-cellulose, and
   (b) extracting the alpha-cellulose from the structure to leave the foamed structure in a permeable condition.
2. The process of claim 1 where the foamed structure is formed by extruding said mixture in a molten state under conditions not favoring substantial expansion.
3. The process of claim 1 where the alpha-cellulose is extracted by a solvent which is not a solvent for the styrene polymer.
4. The process of claim 1 where the alpha-cellulose is extracted with a solvent selected from the group consisting of inorganic acids and inorganic bases.
5. The process of claim 1 where the foamed structure is formed from a molten mixture of expandable styrene polymer and alpha-cellulose which is extruded as a foamed slab.
6. The process of claim 1 where the styrene polymer is polystyrene.
7. The process of claim 1 where the expandable styrene polymer contains a blowing agent.
8. The process of claim 1 where the mixture contains from 5 to 30 percent by weight alpha-cellulose.
9. The process of claim 1 where the mixture is expanded by using high frequency electrical waves to heat the mixture.
10. The method of making a permeable foamed polystyrene which comprises:
    (a) mixing and blending together about ten parts by weight of an alpha-cellulose filler with about ninety parts by weight of an expandable polystyrene having a blowing agent therein,
    (b) exposing the filled expandable polystyrene to high frequency electrical waves until softening and expansion of the filled polystyrene occurs, thereby forming a cellular structure of low density and uniform small voids,
(c) treating the filled foamed polystyrene with an alpha-cellulose swelling agent which is not a solvent for the polystyrene, and
(d) extracting the alpha-cellulose with a solvent which is not a solvent for the polystyrene.

References Cited

UNITED STATES PATENTS 2,787,809  4/1957  Stastny _____ 260—2.5

MURRAY TILLMAN, *Primary Examiner.*

M. FOELAK, *Assistant Examiner.*